Jan. 22, 1924.                                                    1,481,279
                         H. M. ZIPPEL
          APPARATUS FOR ACCUMULATION AND TRANSMISSION OF POWER
                    Filed Feb. 1, 1922          2 Sheets-Sheet 1

Patented Jan. 22, 1924.

1,481,279

UNITED STATES PATENT OFFICE.

HYMAN M. ZIPPEL, OF PHILADELPHIA, PENNSYLVANIA.

APPARATUS FOR ACCUMULATION AND TRANSMISSION OF POWER.

Application filed February 1, 1922. Serial No. 533,440.

*To all whom it may concern:*

Be it known that HYMAN M. ZIPPEL, a subject of the King of Great Britain, residing at Philadelphia, in the county of Philadelphia and State of Pennsylvania, has invented certain new and useful Improvements in Apparatus for Accumulation and Transmission of Power, of which the following is a specification.

This invention relates to the storage and transmission of power.

The primary purpose of my invention is to provide means for the accumulation or storage and the transmission of power to a driving shaft, with the intermittent use of a motor.

This end is attained by accumulating or storing power from coiled springs, or a series of coiled springs, adapted to be automatically wound in turn, or by series, on a shaft driven by a motor, one spring, or series of springs, winding as the other spring, or series of springs, is unwinding and transmitting its power to drive a shaft connected to the object to be driven.

With this and other objects in view, the invention consists in certain novel and peculiar features of construction and combination of parts as hereinafter described, and claimed; and in order that it may be fully understood reference is to be had to the accompanying drawing, in which:—

Figure 1:
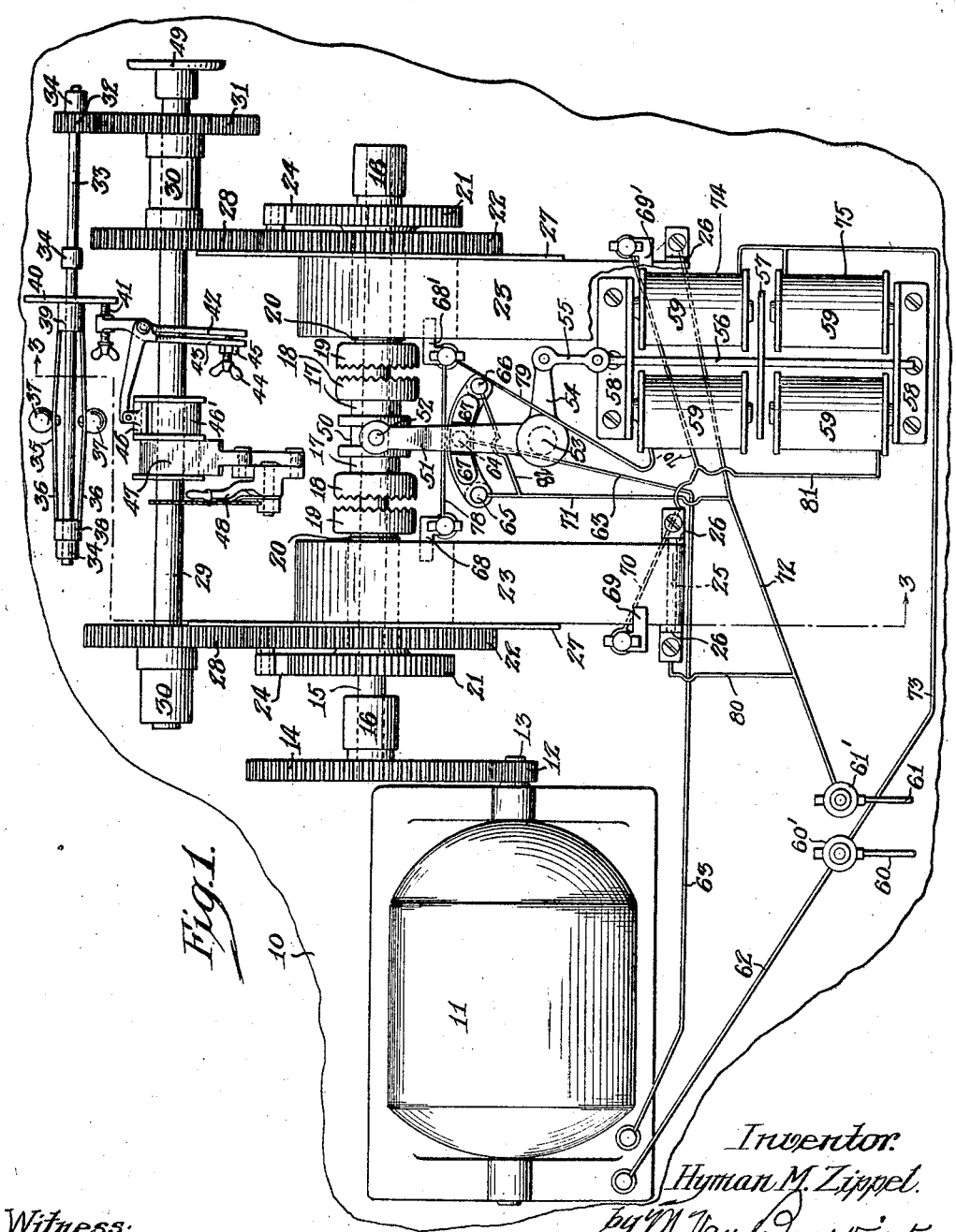
Figure 1 is a plan view of the assembled device.

Referring now in detail to the various figures of the drawing, wherein like reference characters indicate like parts, 10 represents a suitable base on which is positioned and secured, in any conventional manner, a motor 11.

A pinion 12 is mounted on a projecting end of a transverse shaft 13 of the said motor 11 and meshes with a gear 14 mounted on the inner terminal of a transverse power shaft 15, journaled in the bearings 16—16, which are integral with the supports 16'.

A sleeve 17, terminating at each end in toothed clutch members 18—18 is feathered on said shaft 15 rotating therewith. Said toothed clutch members 18—18 are adapted for engagement with like clutch members 19—19 integral with the inner terminals of arbor sleeves 20—20, mounted and rotatable on said shaft 15 and rotatable with said shaft 15 when the clutch members 18 and 19 are in engagement.

Ratchet wheels 21—21 are rigidly secured to the outer terminals of said sleeves 20—20 and obviously rotate therewith.

Spur gears 22—22 are loosely mounted on said sleeves 20—20 between the ratchet wheels 21—21 and springs 23—23, and on the outer sides of said spur gears 22—22 are secured ratchet pawls 24—24 to engage the said ratchet wheels 21—21.

Said springs 23—23, which are of the flat coiled type, are pin fastened as at 23' to the arbor sleeves 20—20. At their opposite ends said springs 23—23 are looped and mounted on transverse bars 25, secured in openings in vertical supports 26—26.

As a guide for the springs 23—23 annular plates 27—27 are mounted on the shaft 15 between said springs 23—23 and the spur gears 22—22.

Meshing with the spur gears 22—22 are similar gears 28—28 mounted on a transverse driving shaft 29 paralleling the shaft 15; said shaft 29 being journaled in the bearings 30—30 integral with the supports 30'.

Mounted on said shaft 29, adjacent its outer terminal, is a gear 31 meshing with a pinion 32 mounted on the outer end of an inwardly extending transverse governor shaft 33, paralleling the shafts 15 and 29, and journaled in the bearings 34—34—34, integral with the supports 34'.

A governor 35, comprising two flat spring blades 36—36 and two spherical weights 37—37 thereon, is mounted on said shaft 33, the inner terminals of said blades 36—36 being headed in a solid collar 38 on the shaft 33 adjacent its inner terminal, and the opposite ends of said blades 36—36 being secured in a collar 39 slidable on said shaft 33.

Said slidable collar 39 is provided with a flange 40. Impinging against said flange 40 is an adjustable wing nut 41, mounted in scissor-shaped levers 42—43. At the opposite terminals of said levers 42—43 is an additional wing nut 44 by means of which adjustments may be made between said levers 42—43, and a lock nut 45 is also provided, as shown, to maintain any adjustment so made.

At the upper end of lever 42 is mounted a brake shoe 46 impinging against a brake collar 46' mounted rigidly on the shaft 29. Adjoining said brake collar 46' is a permanent brake band 47 attached to a sector hand lever 48 mounted on a support 48'.

A flanged union 49 is provided on the outer terminal of the shaft 29 to connect said shaft 29 with the object to be driven.

A shift collar 50 is mounted rigidly on the sleeve 17, substantially, medially thereof, between the clutch members 18—18.

Figure 2:
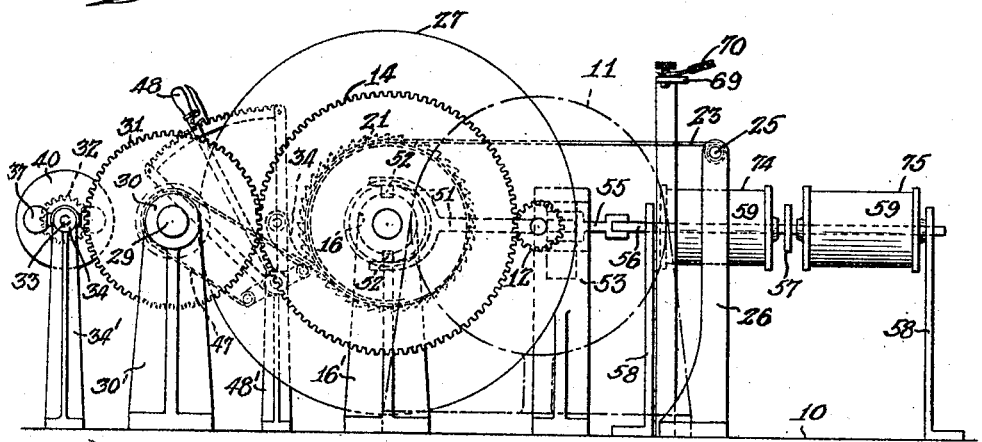
Figure 2 is an end elevational view.
Figure 3:
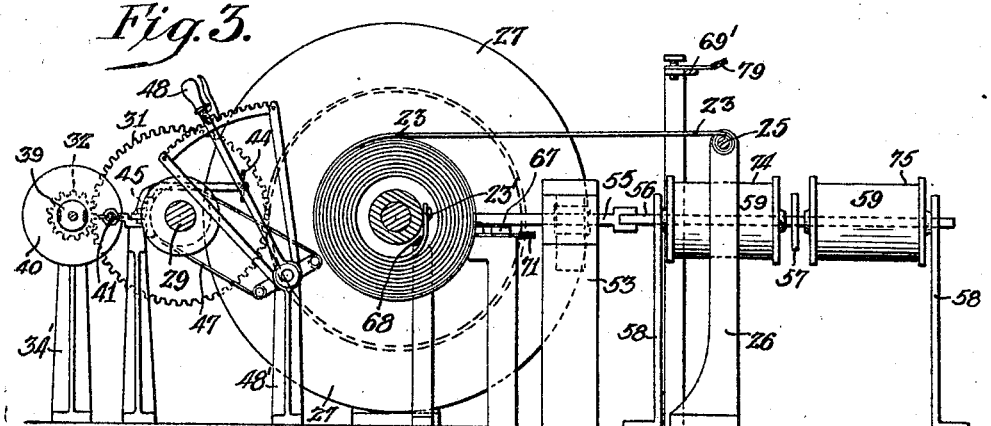
Figure 3 is a sectional view on line 3—3 of Fig. 1.

A forked L shaped lever 51, mounted and fulcrumed in a support 53, is secured to the shift collar 50 by means of the pins or lugs 52—52 as particularly illustrated in dotted lines in Fig. 2 of the drawing.

A link rod 55 is secured to the member 54 of said lever 51, and connects said lever 51 to a magnet armature rod 56, on which is mounted a magnet armature 57. Said rod 56 is guided in supports 58—58 which also support the magnet coils 59, comprising the magnets 74 and 75.

In Fig. 1 of the drawing each spring 23—23 is illustrated as wound and ready to dispense its accumulated compression force, by means of the ratchet wheels 21—21, ratchet pawls 24—24 and intermeshing gears 22—22 and 28—28, to the driving shaft 29, as required. The clutches 18—18 and 19—19 are shown out of engagement, and the lever 51 out of contact with the electrical contact blades 67—67. In actual operation, however, one spring 23 will be winding on the sleeve 20, while the other spring 23 is unwinding.

Assuming for the purposes of operative description that the springs 23—23 are each unwound and are therefore in contact with contact points 69 and 69', and it is desired to first wind the right hand spring 23.

Electrical current is caused to enter through bus line 60, post 60', passes along wire 73 into the lower coils 59—59, comprising the magnet 75; the current leaves magnet 75 by the wire 81 and connecting wires 70 and 70', respectively, to contact points 69 and 69' in contact with said springs 23—23, (each spring 23 being unwound), and through said springs 23—23 to spring supports 26—26; said spring supports 26—26 are connected by a wire 80 and extension of wire 72, to said wire 72 which leads to post 61' of the return bus line 61, thereby completing a circuit.

The current will thereby energize the coils 59—59 of the magnet 75 causing the armature 57 to be attracted towards said magnet 75, which action will pull armature rod 56 rearwardly and through the medium of the connecting link rod 55 to the lever 51, and said lever 51, will shift the sleeve 17 to the right forcing the right hand clutch members 18 and 19 into engagement and the lever 51 in contact with the blade 67 and contact point 66.

The sleeve 17 carrying the clutch member 18 being rotatable with the shaft 15 and sleeve 20 carrying the clutch member 19 and spring 23 being likewise rotatable with said shaft 15, when the clutch members 18 and 19 are in engagement, current is obtained through bus line 60, post 60' and wire 62 to motor 11; current leaves motor 11 by means of the wire 63 to contact point 64 on lever 51, through blade 67 to contact point 66, thence by wire 82 to wire 71 to wire 72 to post 61' and return bus line 61, completing a circuit.

The motor 11 being thus energized the shaft 13 thereof will rotate and by means of the gearing hereinabove described, will rotate the shaft 15 winding the right hand spring 23 on the arbor sleeve 20 on said shaft 15.

When wound said right hand spring 23 loses contact with point 69' and contacts against contact point 68', breaking the former circuit. The current will then pass down wire 79 to the upper coils 59—59 of the magnet 74; the said coils 59—59 of magnet 74 being thus energized the armature 57 will be attracted forwardly towards said magnet 74, which in turn will pull armature rod 56 forwardly and through the medium of the connecting rod 55 to the lever 51, and said lever 51, will shift the sleeve 17 to the left forcing the right hand clutches 18 and 19 out of engagement and the left hand clutches 18 and 19 into engagement and completing a circuit through contact point 64 on lever 51, blade 67, contact point 65, wire 71 and wire 72, post 61' to return bus line 61.

The left hand spring 23 is then wound in the same manner as just described relative to the right hand spring 23, and the said springs 23—23 are wound in turn, as may be requisite, the clutches being automatically shifted laterally when either spring 23—23 becomes wound, as just above described.

When a spring 23 is wound it can exert its mechanical force against a ratchet 21, said ratchet 21 being rigid with the sleeve 20 carrying said spring, pawl 24 and intermeshing gears 22 and 28, whereby the shaft 29 will be rotated transmitting its power through the connection 49 to the object to be driven.

Power is thus stored and accumulated in the coiled wound springs 23—23 to be dispensed to the shaft 29 as required. When both springs 23—23 are wound as illustrated in Fig. 1 of the drawing, the contact point 64 on the lever 51 does not contact with either blade 67—67 and the circuit is broken and the motor 11 rests. A wire 78 connects the contact points 68 and 68′.

Novel means are shown for governing the speed of the rotation of the shaft 29, comprising the scissor-shaped levers 42 and 43, wing nut 44, lock nut 45, brake shoe 46 and brake collar 46′. By these means the speed of the revolving shaft 29 may be regulated to a determinate limit by adjustment of said levers 42 and 43.

Figure 4:
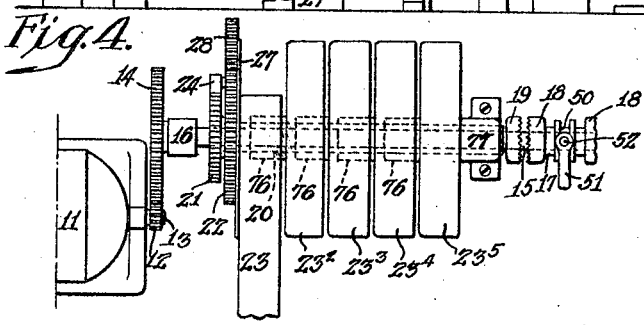
Figure 4 is a plan view of a modification, wherein multiple springs are employed.

A modification of the device is shown in Fig. 4 of the drawings, wherein multiple right hand springs 23 and multiple left hand springs 23 are utilized in lieu of the single right and left hand springs 23—23 as just described, for the purpose of accumulating additional compression force in each series of springs.

The additional springs are positioned in spring chambers formed of cupped shells or casings $23^2$, $23^3$, $23^4$ and $23^5$, each additional spring having an inwardly projecting boss 76. The outer end of each additional spring being secured in its individual shell and the inner end of said spring being secured in the boss 76 on the adjoining shell. The sleeve 20 extends through the series of springs and is positioned and operates in the same manner as tho but one spring was positioned thereon. An additional bearing 77 is provided as shown.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention what I claim as new and desire to secure by Letters Patent is:—

1. In a device of the class described, a motor driven shaft, sleeves mounted on said shaft, coiled springs secured to said sleeves and to supports, clutch mechanism to engage said sleeves alternately to cause them in turn to rotate on said shaft to wind the springs secured thereto, electrically controlled means to shift said clutch mechanism laterally when a spring is wound and means to automatically shut off the motor when said springs are wound, substantially as described.

2. In a device of the class described, a motor driven shaft, sleeves mounted on said shaft, coiled springs secured to said sleeves and to supports, clutch mechanism to engage said sleeves alternately to cause them in turn to rotate on said shaft to wind the springs secured thereto, electrically controlled means to shift said clutch mechanism laterally when a spring is wound and means to automatically shut off the motor when the said springs are wound and to start said motor when a spring is unwound, substantially as described.

3. In a device of the class described, a motor driven shaft, arbor sleeves mounted on said shaft, coiled springs secured to said sleeves and to supports, clutch mechanism to engage said sleeves alternately to cause them in turn to rotate on said shaft to wind the said springs secured thereto, electrically controlled means to shift said clutch mechanism laterally when a spring is wound, a driving shaft and gearing connecting said arbor sleeves with said driving shaft whereby as said springs unwind they will rotate said driving shaft, substantially as described.

4. In a device of the class described, a motor driven shaft, arbor sleeves mounted on said shaft, coiled springs secured to said sleeves and to supports, clutch mechanism to engage said sleeves alternately to cause them in turn to rotate on said shaft to wind the said springs secured thereto, electrically controlled means to shift said clutch mechanism laterally when a spring is wound, a driving shaft, gearing connecting said arbor sleeves with said driving shaft whereby as said springs unwind they will rotate said driving shaft and means to limit the rotation of said driving shaft to a determinate speed, substantially as described.

5. In a device of the class described, a motor driven shaft, arbor sleeves mounted on said shaft, coiled springs secured to said sleeves and to supports, clutch mechanism to engage said sleeves alternately to cause them in turn to rotate on said shaft to wind the said springs secured thereto, electrically controlled means to shift said clutch mechanism laterally when a spring is wound and multiple coiled springs operably connected with said sleeve springs adapted to be wound in unison therewith, substantially as described.

6. In a device of the class described, a motor driven shaft, arbor sleeves mounted on said shaft, coiled springs secured to said sleeves and to supports, clutch mechanism to engage said sleeves alternately to cause them in turn to rotate on said shaft to wind the said springs secured thereto, electrically controlled means to shift said clutch mechanism laterally when a spring is wound, a series of coiled springs positioned in cupped spring chambers mounted on said shaft, an inwardly projecting boss on each spring, the outer end of each spring of a series being secured in its individual shell and the inner end thereof being secured in the boss on the adjoining spring, the adjacent springs to said sleeve springs being connected therewith, whereby a series of springs will be wound in unison with said sleeve springs, substantially as described.

In testimony whereof I affix my signature.

HYMAN M. ZIPPEL.